United States Patent
Boezen

(10) Patent No.: US 9,819,264 B1
(45) Date of Patent: Nov. 14, 2017

(54) CONTROLLER FOR A POWER CONVERTER

(71) Applicant: NXP B.V., Eindhoven (NL)

(72) Inventor: Hendrik Boezen, Nijmegen (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/478,024

(22) Filed: Apr. 3, 2017

(30) Foreign Application Priority Data

Jul. 14, 2016 (EP) ..................... 16179571

(51) Int. Cl.
| | |
|---|---|
| *H02M 3/156* | (2006.01) |
| *H02M 1/08* | (2006.01) |
| *H05B 33/08* | (2006.01) |
| *H02M 3/157* | (2006.01) |
| *H02M 1/00* | (2006.01) |

(52) U.S. Cl.
CPC .............. *H02M 3/156* (2013.01); *H02M 1/08* (2013.01); *H05B 33/0815* (2013.01); *H05B 33/0845* (2013.01); *H02M 2001/0009* (2013.01)

(58) Field of Classification Search
CPC .... H02M 3/156; H02M 3/1563; H02M 3/157; H02M 3/158; H02M 3/1588
See application file for complete search history.

(56) References Cited

U.S. PATENT DOCUMENTS

| | | | |
|---|---|---|---|
| 6,693,411 B2 * | 2/2004 | Bub ...................... | H02M 3/156 323/222 |
| 7,492,140 B2 * | 2/2009 | Solivan ............... | H02M 3/1588 323/222 |
| 7,548,047 B1 | 6/2009 | Dasgupta et al. | |
| 2007/0262724 A1 | 11/2007 | Mednik et al. | |
| 2014/0159598 A1 | 6/2014 | Boezen | |
| 2014/0184187 A1 | 7/2014 | Hwang et al. | |
| 2015/0042299 A1 * | 2/2015 | Li .......................... | H02M 1/36 323/271 |

FOREIGN PATENT DOCUMENTS

EP          2741578 A1      11/2014

OTHER PUBLICATIONS

Semiconductor Components Industries, LLC, "NCV78763 Power Ballast and Dual LED Driver for Automotive Front Lighting 2nd Generation," 2017, http://www.onsemi.com/pub/Collateral/NCV78763-D.PDF, 49 pages.

(Continued)

*Primary Examiner* — Gary L Laxton

(57) ABSTRACT

A controller for a power converter. The power converter comprises a converter-switch and a converter-inductor. The controller comprises a controller-output-terminal configured to provide a switch-control-signal for the converter-switch, a comparator and a delay-block. The comparator can provide a comparator-output-signal that has a comparator-output-state dependent on whether or not a sensed-signal is greater than a reference-signal, wherein the comparator-output-state can take a first-state-value or a second-state-value. The delay-block can: set a time-delay-value based on: (i) a voltage across the converter-inductor; start a timer when the comparator-output-state changes; and cause a change in the switch-control-signal when the timer reaches the time-delay-value.

15 Claims, 4 Drawing Sheets

(56) References Cited

OTHER PUBLICATIONS

NXP Semiconductors N.V., "ASL3416SHN—Enhanced three channel LED buck driver" Product data sheet, Rev. 5, Feb. 22, 2017, 38 pages.
Enz et al., "Circuit Techniques for Reducing the Effects of Op-Amp Imperfections: Autozeroing, Correlated Double Sampling, and Chopper Stabilization," Prokceedings of the IEEE, vol. 84, No. 11, Nov. 1996, 31 pages.

* cited by examiner

CONTROLLER FOR A POWER CONVERTER

BACKGROUND

The present disclosure relates to controllers for power converters such as power factor correction circuits.

Light Emitting Diodes (LEDs) can benefit from being driven with a constant average current. Power regulators that provide power to LED circuits include both a comparator and a gate driver that have a delay. An inductor current will overshoot past an upper threshold, and undershoot below a lower threshold. Even if a turn-on delay is the same as a turn off delay, the rate of change of the inductor-current when it is rising is often not the same as when it is falling. This can result in an undesirable shift of the average current because the magnitude of the overshoot is not the same as the magnitude of the undershoot. That is, the delays in the comparators and a gate driver may lead to an average current that deviates from the target value. This can be caused by the delay in the comparator hysteresis and gate driver, and causes overshoot and undershoot which depends on the change in inductance over time (dI/dt). Furthermore, the size of the deviation depends on the actual output voltage.

Such a deviation can be a particular problem for so called matrix beam applications. For matrix beam applications, all LEDs are connected in series with each other, and may need to be dimmable individually. This can be done by selectively shorting some LEDs in the string with a PWM (pulse width modulated) signal. A problem can arise because shorting the LEDs causes the total string voltage to change, which as discussed above can result in an undesirable shift in the average output current.

BRIEF DESCRIPTION OF THE DRAWINGS

The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which.

DETAILED DESCRIPTION OF THE DRAWINGS

Figure 1:
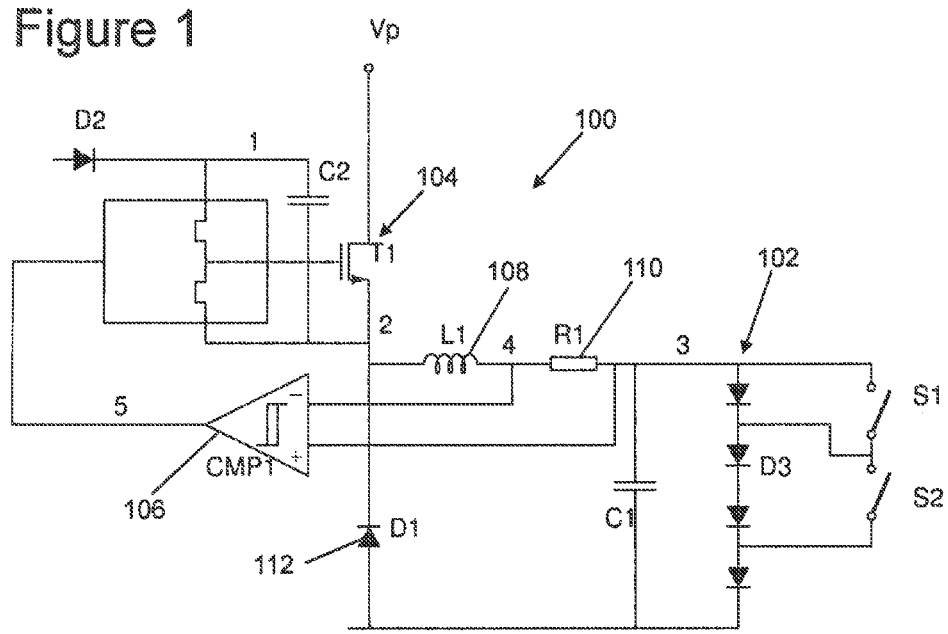
FIG. 1 shows a buck converter with a constant current regulation loop for providing a constant average current to an LED string.

FIG. 1 shows a buck converter 100 with a constant current regulation loop for providing a constant average current to an LED string (D3) 102.

The buck converter 100 includes a converter-switch 104 (T1), which can also be referred to as a power-switch, and a converter-inductor 108. In this example the converter-switch 104 is a FET.

The switching of the converter-switch 104 is controlled by a hysteretic comparator 106 (CMP1) which has an upper and lower switching threshold. The inductor current flows through a sense-resistor 110 (R1). As soon as the inductor current drops below the lower threshold, the converter-switch 104 is switched on. This causes the inductor current to increase, until the upper threshold is reached. Then the converter-switch 104 is switched off, and the inductor current continues to flow through a converter-diode 112 (D1). Now the current decreases until the lower threshold is reached again.

Figure 2:
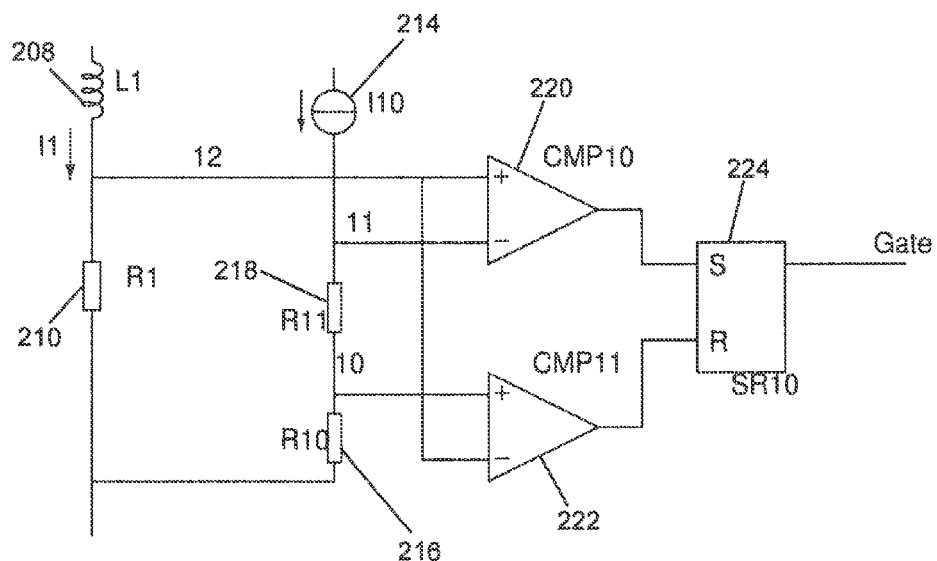
FIG. 2 shows an example implementation of the hysteretic comparator of FIG. 1.

FIG. 2 shows an example implementation of the hysteretic comparator of FIG. 1. The converter-inductor 208 is shown as L1, and the sense-resistor 210 is shown as R1. A reference-current-source 214 (110) provides a reference current that flows through a resistive divider provided by a first-reference-resistor 216 (R10) and a second-reference-resistor 218 (R11).

This circuit has two comparators that define a lower and an upper trip level for an inductor current level in the buck converter. More particularly, an upper-comparator 220 (CMP10) detects when the inductor current exceeds the upper threshold, and a lower-comparator 222 (CMP11) detects when the inductor current drops below the lower threshold. As indicated above, the converter-switch (which is an example of an external FET) of the buck converter is switched on when the current falls below the lower trip level, and is turned off when the current exceeds the upper trip level. In this way, the average inductor current can be regulated to a well-defined average value.

Hysteresis is provided by the SR (set-reset) latch 224 (SR10), which provides a switch-control-signal (labelled as "Gate" in FIG. 2) to control the converter-switch (not shown in FIG. 2).

In a practical application, disturbances from other circuits may cause the comparators 220, 222 to trip early, which can cause fluctuations in the average current.

Figure 3:
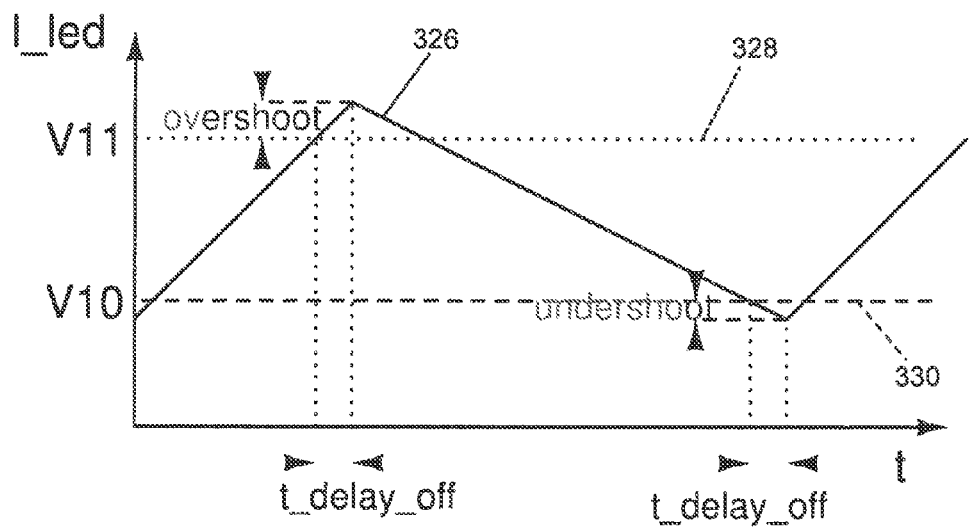
FIG. 3 shows a plot of inductor current over time, for the circuit of FIGS. 1 and 2.

FIG. 3 shows a plot of inductor current 326 over time, for the circuit of FIGS. 1 and 2, and also shows an upper-threshold 328 and a lower-threshold 330. The converter is controlled such that the converter-switch is operated in response to the inductor current 326 reaching one of the upper-threshold 328 and the lower-threshold 330. In this way, the inductor current 326 ramps between the upper threshold 328 and the lower threshold 330.

Because both the comparator and the gate driver of the circuit have a delay, the inductor current 326 will overshoot past the upper threshold 328, and undershoot below the lower threshold 330. Even if a turn-on delay is the same as a turn off delay as shown in FIG. 3, the rate of change of the inductor-current 326 when it is rising is often not the same as when it is falling. This can result in an undesirable shift of the average current because the magnitude of the overshoot is not the same as the magnitude of the undershoot. That is, the delays in the comparators and a gate driver may lead to an average current that deviates from the target value. This can be caused by the delay in the comparator hysteresis and gate driver, and causes overshoot and undershoot which depends on the dI/dt. Furthermore, the size of the deviation depends on the actual output voltage (which is at node 3 in FIG. 1).

As will be discussed below, one or more examples disclosed herein can address the above issue. For example, a circuit can be provided that contains a single comparator to sense the LED current. Also, the converter-switch may not be switched by the comparator immediately, but only after a time delay. This delay time can be set such that it is inversely proportional to the voltage across the inductor, which can result in a system that is not sensitive to disturbances in the same way as the systems of FIGS. 1 and 2.

Figure 4:
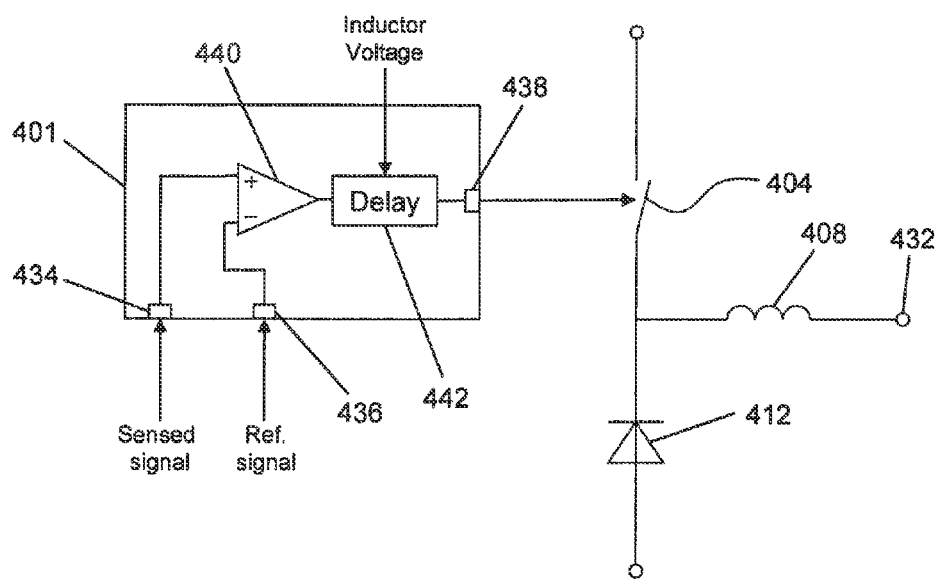
FIG. 4 shows an example embodiment of a controller for a power converter.

FIG. 4 shows an example embodiment of a controller 401 for a power converter. The power converter may be a switched mode power supply (SMPS) or a buck converter, as non-limiting examples.

The power converter comprises at least a converter-switch 404 and a converter-inductor 408. In this example, a converter-diode 412 and an output-terminal 432 are also shown. It will be appreciated that the specific layout of these components can vary depending upon the type of power converter that is being used.

The controller 401 includes a sensed-input-terminal 434 for receiving a sensed-signal that is representative of operation of the power converter. The sensed-signal can be representative of an instantaneous operating condition of the power converter, such as the current through the converter-inductor 408. The sensed-signal in this example can therefore be considered as a sensed-current. In other examples, the sensed-signal can be a sensed-voltage.

The controller 401 also includes a reference-input-terminal 436 for receiving a reference-signal. The reference-voltage can be representative of a desired/target level for the sensed-signal, which in this example is the current flowing through the converter-inductor 408.

The controller 401 also includes a controller-output-terminal 438 for providing a switch-control-signal to the converter-switch 404. As is known in the art of power converters, the converter-switch 404 can be operated in order to sequentially put energy into, and take energy out of, the converter-inductor 408 such that the current or voltage at the output-terminal 432 can be controlled.

The controller 401 includes a comparator 440 and a delay-block 442. The comparator 440 receives the sensed-signal and the reference-signal as input signals, and provides a comparator-output-signal that has a comparator-output-state dependent on whether or not the sensed-signal is greater than the reference-signal. For example, the comparator-output-state can take a first-state-value (0) or a second-state-value (1).

The delay-block 442 receives an inductor-voltage-signal representative of a voltage across the converter-inductor 408. The delay-block 442 can then set a time-delay-value based on the voltage across the converter-inductor 408. In some examples, the time-delay-value can also be set based on a timing-constant, as will be discussed below. The delay-block 442 also receives the comparator-output-signal from the comparator 440. When the comparator-output-state changes (either from the first-state-value (0) to the second-state-value (1), or from the second-state-value (1) to the first-state-value (0)), the delay-block 442 starts a timer, which may be an analogue or a digital timer. Then, when the timer reaches the time-delay-value, the delay-block 442 causes a change in the switch-control-signal such that the state of the converter-switch 404 is changed.

Advantageously, the controller 401 of FIG. 4 can control the power converter such that it is less sensitive to disturbances, and therefore less likely to result in fluctuations in the average current though the load/LED. This can result in more accurate control of the power converter, especially for dynamically changing loads.

Figure 5:
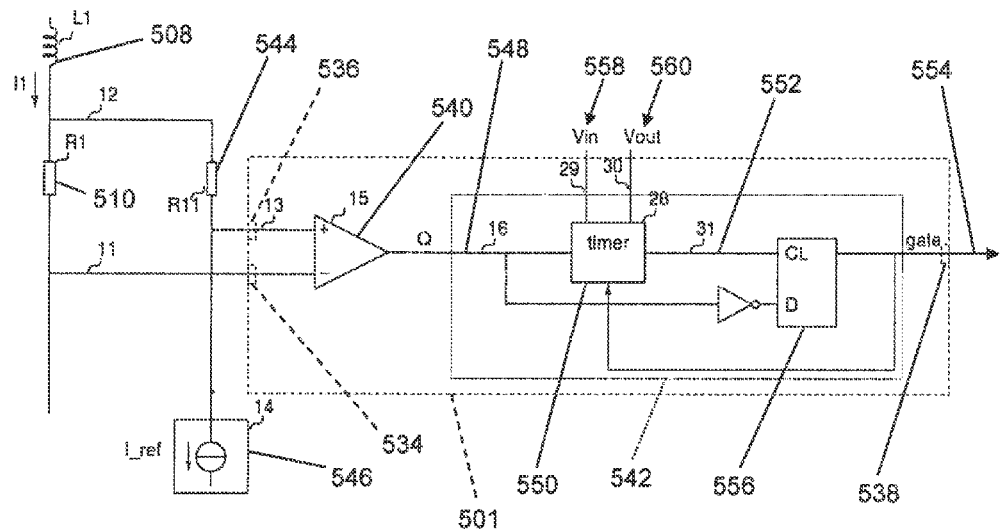
FIG. 5 shows an example implementation of the circuit of FIG. 4.

FIG. 5 shows an example implementation of the circuit of FIG. 4. Features of FIG. 5 that have already been described with reference to FIG. 4 will be given corresponding reference numbers in the 500 series and will not necessarily be described again here.

In FIG. 5, the converter-inductor 508 is connected in series with a sense-resistor 510. One of the terminals of the sense-resistor 510 is connected to a sensed-input-terminal 534 of the controller 501. In this way, a sensed-voltage-signal, which is representative of the instantaneous current flowing through the converter-inductor 508, is provided as an input signal to the controller 501.

Also connected to the converter-inductor 508 in the example of FIG. 5 is a reference-resistor 544. The reference-resistor 544 is connected in series between the converter-inductor 508 and a reference-current source 546. The node between the reference-resistor 544 and the reference-current-source 546 is connected to a reference-input-terminal 536 of the controller 501. In this way, a reference-voltage-signal, which is representative of the current flowing through the reference-resistor 544, is provided as an input signal to the controller 501. The level of the reference-current-source 546 can be set such that the reference-voltage-signal defines a desired target value for the current through the converter-inductor 508.

In the same way as FIG. 4, the controller 501 of FIG. 5 includes a comparator 540 that receives the sensed-voltage-signal and the reference-voltage-signal as input signals, and provides a comparator-output-signal (Q) 548 that has a comparator-output-state dependent on whether or not the sensed-voltage-signal is higher or lower than the target, as defined by the reference-voltage-signal. In this example only a single comparator 540 is used, and the sensed-voltage-signal is compared to only one threshold (the reference-voltage-signal).

The comparator-output-signal (Q) 548 is provided as an input signal to a timer 550, which in this example is an analogue timer. The timer 550 starts counting when there is a change in the state of the comparator-output-signal (Q) 548, and causes a change in a timer-output-signal 552 (and also a change in a switch-control-signal 554) when the timer 550 reaches a time-delay-value.

In this example, the duration of the time-delay-value depends upon the state of the switch-control-signal 554. That is, if the switch-control-signal 554 has a first-state-value (0), which is representative of the converter-switch (not shown) being off (open circuit), then a switch-on-time-delay-value is applied. If the switch-control-signal 554 has a second-state-value (1), which is representative of the converter-switch being on (closed circuit), then a switch-off-time-delay-value is applied. In this way, different time delays can be applied depending upon whether the timer is counting down to a transition in the switch-control-signal 554 from the first-state-value to the second-state-value, or vice versa.

The single timer 550 of FIG. 5 will be described below as providing the functionality of a switch-off-timer and a switch-on-timer. It will be appreciated that this functionality may be provided by separate timer circuits in other examples.

When the switch-control-signal 554 has the first-state-value (0), which is representative of the converter-switch being off, then the timer applies a switch-on-time-delay-value, and can be considered as a switch-on-timer. The switch-on-time-delay-value (tgon) in this example is set based on (i) a negative value of the voltage across the converter-inductor $(-V_L)$; and (ii) a switch-on-constant (constant$_{on}$). The switch-on-constant (constant$_{on}$) is an example of a timing-constant, which in this example is fixed. In this example, the switch-on-time-delay-value (tgon) is inversely proportional to the converter-inductor.

$$tgon = constant_{on}/(-V_L)$$

When the converter-switch is off, which is the case when the switch-on-timer is being used, the output voltage (Vout) of the power-converter can be used as the negative value of the voltage across the converter-inductor ($-V_L$). The output voltage can also be referred to as Vled. Therefore, the switch-on-time-delay-value (tgon) can be defined as:

$$tgon = \frac{Tref * Vref}{Vled}$$

Where Tref and Vref can together be considered as a timing-constant. As will be discussed below with reference to FIG. 8, in some examples Tref and Vref can be modified during operation using feedback in order to improve performance.

Therefore, when the signal-state of the comparator-output-signal 548 changes from the second-state-value (1) to the first-state-value (0), the switch-on-timer 550 causes a change in the timer-output-signal 552 when it reaches the switch-on-time-delay-value.

When the switch-control-signal 554 has the second-state-value (1), which is representative of the converter-switch being on, then the timer applies a switch-off-time-delay-value, and can be considered as a switch-off-timer. The switch-off-time-delay-value (tgoff) in this example is set based on (i) the voltage across the converter-inductor ($V_L$); and (ii) a switch-off-constant (constant$_{off}$). The switch-off-constant (constant$_{off}$) is an example of a timing-constant, and in this example the switch-off-time-delay-value (tgoff) is inversely proportional to the converter-inductor.

$$tgoff = constant_{off}/V_L$$

When the converter-switch is on, which is the case when the switch-off-timer is being used, the difference between (i) the input voltage (Vin) of the power-converter and (ii) the output voltage (Vout) of the power converter, can be used as the voltage across the converter-inductor ($V_L$). The output voltage can also be referred to as Vled. Therefore, the switch-off-time-delay-value (tgoff) can be defined as:

$$tgoff = \frac{Tref * Vred}{Vin - Vled}$$

Where Tref and Vref can together be considered as a timing-constant.

Therefore, when the signal-state of the comparator-output-signal 548 changes from the first-state-value (0) to the second-state-value (1), the switch-off-timer 550 causes a change in the timer-output-signal 552 when it reaches the switch-off-time-delay-value.

It will be appreciated from the below description of FIG. 8 that the values for Tref and Vref that are used for calculating tgoff will not necessarily be the same as the values for Tref and Vref that are used for calculating tgon.

As shown in FIG. 5, the input voltage (Vin) of the power-converter 558 and the output voltage (Vout/Vled) of the power converter 560 can be provided as input signals to the timer 550. Therefore, the timer 550 has the information it requires to determine the values of the switch-on-time-delay-value (tgon) and the switch-off-time-delay-value (tgoff).

The timer-output-signal 552 is provided to a clock-input-terminal of a D-type flip flop 556. An inverted version of the comparator-output-signal 548 is provided to a data-input-terminal of the D-type flip flop 556. A D-type-output-terminal is connected to the controller-output-terminal 538 of the controller 501, in order to provide the switch-control-signal 554. It will be appreciated that alternative components could be used, instead of the D-type flip flop 556, in order for the change in the timer-output-signal 552 to cause the desired change in the switch-control-signal 554.

Figure 6:
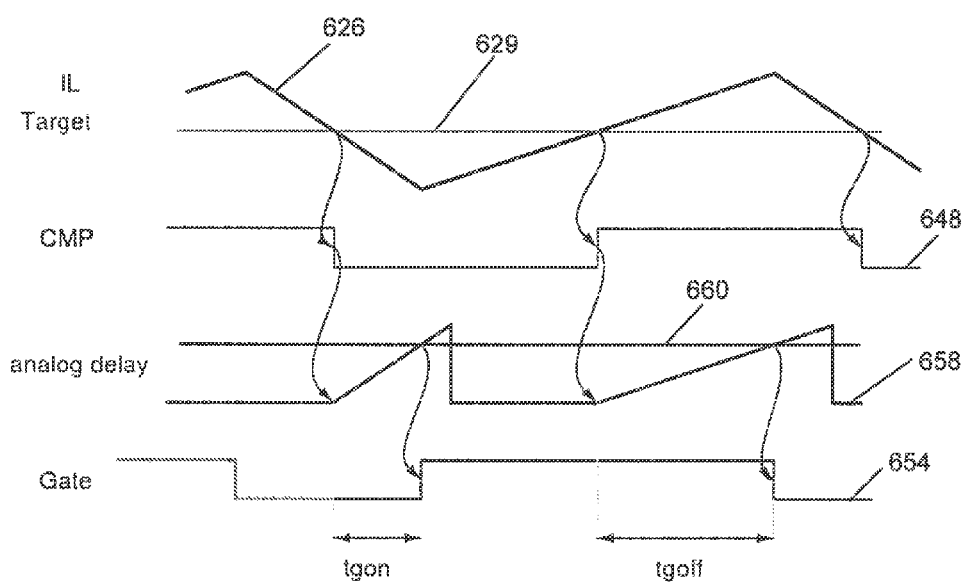
FIG. 6 shows a timing diagram that illustrates operation of the circuit of FIG. 5.

FIG. 6 shows a timing diagram that illustrates operation of the circuit of FIG. 5. The top plot shows the inductor current 626 which ramps up and down depending on the switching of the gate, as defined by the switch-control-signal 654 (which is shown in the bottom plot of FIG. 6). Also shown in the top plot is the reference-signal 629, which represents the target average value for the inductor current 626.

The switch-control-signal 654, marked "Gate" in FIG. 6, indicates the status of the converter-switch (which is defined by the gate of a mosfet in this example). When the switch-control-signal 654 is high, the converter-switch (mosfet) is turned on, and when the switch-control-signal 654 is low, the converter-switch (mosfet) is turned off.

The second plot in FIG. 6 shows the comparator-output-signal 648, which is the output of the comparator. As discussed above, the comparator-output-signal 648 is indicative of whether or not the inductor current 626 is greater than the reference-signal 629.

The third plot shows a counter-value 658 for the timer, and a timer-threshold value 660. The timer-threshold value 660 is a constant value in this example. One example of how the timer-threshold value 660 can be implemented will be discussed in more detail below with reference to FIG. 8.

As shown in FIG. 6, at a falling edge of the comparator-output-signal 648, the counter-value 658 of the switch-on-timer starts increasing, that is, the switch-on-timer is started. In the example of FIG. 8, which will be discussed below, the timer is an analogue timer that is implemented by charging a capacitor with a current. The counter-value line 658, as it is shown in FIG. 6 is the voltage across this capacitor. The charging current of the capacitor is proportional to the output voltage Vled, and it can be derived from the output voltage by means of a resistor in one example, as shown in FIG. 8.

When the capacitor voltage (the counter-value 658) reaches the timer-threshold value 660, the gate of the mosfet is switched on (as represented by the low-to-high transition of the switch-control-signal 654 in FIG. 6). This causes the inductor current 626 to rise again.

As the inductor current 626 rises, it will reach the reference-signal 629, which causes a positive edge in the comparator-output-signal 648. During this time, the counter-value 658 is reset to zero. This positive/rising edge in comparator-output-signal 648 causes the switch-off-timer to start counting, and therefore the counter-value 658 starts increasing again. This time, for the switch-off-counter, the charging current to the capacitor is proportional to Vin−Vled. In combination with the timing-constant (Tref*Vref) described above, the different charging currents for the switch-off-counter and the switch-on-counter contribute to the slope of the counter-value 658 line being different, depending upon whether the switch-on-counter or the switch-off-counter is being used.

When the counter-value 658 reaches the timer-threshold value 660, the gate of the mosfet is switched off (as represented by the high-to-low transition of the switch-control-signal 654 in FIG. 6).

The result of the operation illustrated by FIG. 6 is a constant ripple current, which can be similar to the hysteretic converter that was described with reference to FIGS. 1 and 2, except now the switching frequency advantageously does not depend on the sense resistor value or inductor value, and is independent of the value of external components.

Using the above equations for tgon and tgoff, the ripple current can be expressed as:

$$\text{ripple current} = \frac{2 * tgon * Vled}{L} = \frac{2\ Tref\ Vref}{L}$$

Figure 7:
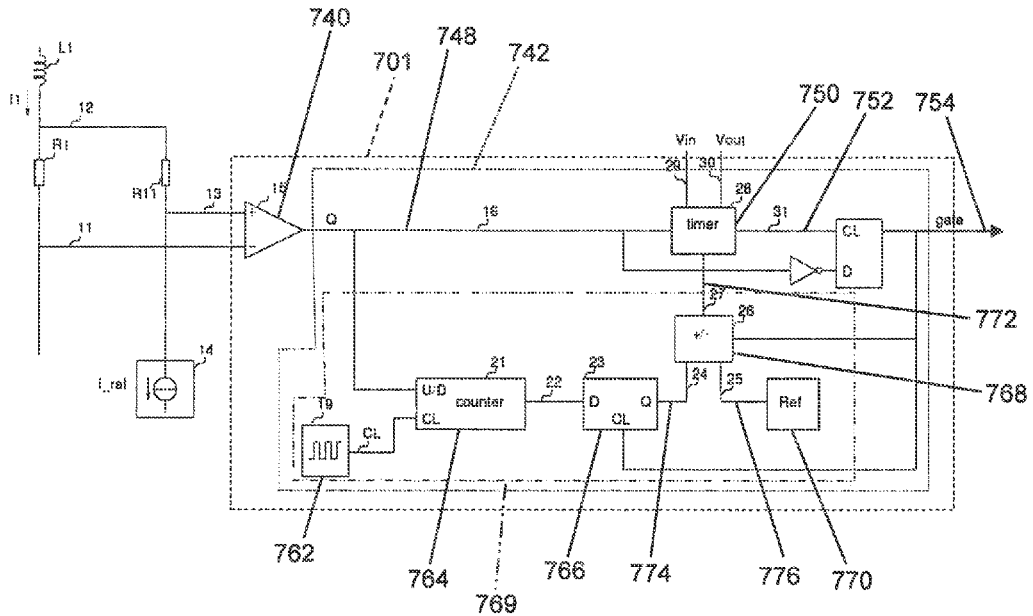
FIG. 7 shows another example embodiment of a controller for a power converter.

FIG. 7 shows another example embodiment of a controller 701 for a power converter, which can advantageously reduce the effects of overshoots and undershoots in the inductor current due to any delays that may be introduced by the comparator, gate driver, or any other components. FIG. 7 can apply a compensation (median control) that aims to reduce or remove any deviation of the average LED current caused by such delays. This can be achieved by using feedback to modify timing-constants.

Components of FIG. 7 that are also shown in FIG. 5 will be given corresponding reference numbers in the 700 series, and will not necessarily be described again here.

In this example, the timer 750 determines the length of a time-delay to be applied based on a received delay-value-signal 772, as will be described in more detail with reference to FIG. 8.

The duty cycle of the comparator-output-signal (Q) 748 is an indication of the median deviation of the actual current from the reference value. That is, if the duty cycle of the comparator-output-signal (Q) 748 is not 50%, then the median value of the sensed inductor current is not the same as the target/reference value. As will be discussed below, the controller 701 of FIG. 7 can adjust the operation of the timer 750 in order to bring the duty cycle closer to 50%, and therefore compensate the effect of any overshoots due to delays that may be introduced in the circuit.

The controller 701 of FIG. 7 includes an up-down-counter 764, with an up-down-input-terminal that receives the comparator-output-signal (Q) 748 from the comparator 740, a clock-input-terminal that receives a clock-signal from a clock-signal-generator 762, and an up-down-output-terminal. The frequency of the clock-signal can be much larger than the maximum switching frequency of the power converter such that there is a significant number of clock pulses for a single switching cycle of the power converter. The up-down-counter 764 provides a count-output-signal, which is representative of an up-down-count-value, at its up-down-output-terminal. When the comparator-output-signal (Q) 748 has first-state-value (for example 0), then for every pulse in the received clock-signal, the up-down-count-value is decremented. Similarly, when the comparator-output-signal (Q) 748 has second-state-value (for example 1), then for every pulse in the received clock-signal, the up-down-count-value is incremented.

Therefore, it will be appreciated that, for a complete switching cycle of the power converter, the up-down-count-value is representative of the duty cycle of the comparator-output-signal (Q) 748. If the up-down-count-value is zero, then the comparator-output-signal (Q) 748 is 50%. If the up-down-count-value is greater than zero, then the comparator-output-signal (Q) 748 is greater than 50% and the inductor current will be too high (which also means that LED current will be too high). If the up-down-count-value is less than zero, then the comparator-output-signal (Q) 748 is less than 50%, and the inductor current will be too low (which also means that LED current will be too low).

Once for every switching cycle of the power converter, the up-down-count-value is copied to a multi bit register, which in this example is a D-type flip-flop 766. The D-type flip-flop 766 is clocked by the switch-control-signal 754 such that the up-down-count-value is copied, once per switching cycle, to the output-terminal of the D-type flip-flop 766. The output of the D-type flip-flop 766 can be considered as a latched-up-down-count-value 774, which is representative of the duty cycle of the comparator-output-signal (Q) 748. The latched-up-down-count-value 774 is provided as an input to a delay-value-signal-generator 768.

In this example, the up-down-counter 764 is not reset at the end of a switching cycle. This means that the up-down-count-value is representative of the duty cycle of the comparator-output-signal (Q) 748 for a plurality of complete switching cycles. In this way, the up-down-counter 764 can continue to count up and down such that on average (for a plurality of switching cycles) there will be just as many high levels as low levels in the comparator-output-signal (Q) 748 at the output of the comparator 740.

The controller 701 also includes a delay-reference-block 770, which can be considered as a (multi bit) reference, which provides a default-delay-signal 776 to the delay-value-signal-generator 768.

The delay-value-signal-generator 768 generates the delay-value-signal 772 for the timer 750 based on the latched-up-down-count-value 774 and the default-delay-signal 776. The timer 750 then sets the delay that is used for each half of the power converter's switching cycle based on the delay-value-signal 772.

If the latched-up-down-count-value 774 is positive or negative (that is, it is not zero), then the delay-value-signal-generator 768 either adds or subtracts the latched-up-down-count-value 774 from the default-delay-signal 776 in order to determine the delay-value-signal 772. The delay-value-signal-generator 768 either adds or subtracts the latched-up-down-count-value 774 based on the state of the switch-control-signal 754. For example, the delay-value-signal-generator 768 can add the latched-up-down-count-value 774 to the default-delay-signal 776 if the switch-control-signal 754 has a first-state; or the delay-value-signal-generator 768 can subtract the latched-up-down-count-value 774 from the default-delay-signal 776 if the switch-control-signal 754 has a second-state.

If the latched-up-down-count-value 774 is zero, then half the time the inductor current is higher than the target/reference, and half the time it is lower. This is because the up-down-counter 764 must have received the same number of up-counts and down-counts. In that case, because the waveform of the inductor current has a triangular shape, the median inductor current is equal to the target. Therefore, irrespective of whether or not the latched-up-down-count-value 774 is added to, or subtracted from, the default-delay-signal 776, the delay-value-signal 772 is representative of the default-delay-signal 776.

The default-delay-signal 776 can be considered as representative of the average value of the delay-value-signal 772 over the two phases of a switching cycle. This is because in a first phase of the switching cycle the latched-up-down-count-value 774 is added to the default-delay-signal 776, and in a second phase of the switching cycle the same value for the latched-up-down-count-value 774 is subtracted from the default-delay-signal 776. Therefore, the switching frequency of the power converter can be set by the value of the default-delay-signal 776.

As discussed above, the value of the delay that is to be applied by the timer 750 is set by the delay-value-signal 772. The timer-output-signal 752 is the delayed signal, which is used to trigger the power-switch/gate to switch.

In this way, when the comparator 740 output is more often high than low, there will be more increments than decrements, and after one cycle, the up-down-count-value is higher than at the beginning of the cycle. This counter value is used to increase the delay to turn on the gate, and to decrease the delay to turn off the gate. As a result, the average current through the inductor will decrease. This will result in the median comparator being high for a smaller fraction of the time, and thereby force the counter to a net decrease of its value after one cycle. This will stabilise at a value where there are the same amount of increments and decrements, leading to no net change of the counter value after one cycle. When this happens, the median current is the same as the target value.

One or more of the clock-signal-generator 762, the up-down-counter 764, the D-type flip-flop 766, the delay-reference-block 770 and the delay-value-signal-generator 768 can together be considered as a calibration-block 769. The clock-signal-generator 762 can be considered as clocking the calibration-block 769. As discussed above, the calibration-block 769 can determine an up-down-count-value, which is representative of a difference between, for a complete switching cycle: (a) a length of time that the comparator-output-signal 748 is in a first-state-value, and (b) a length of time that the comparator-output-signal 748 is in a second-state-value. The calibration-block 769 then can modify the timing-constant based on the up-down-count-value. The calibration-block 769 can modify the timing-constant (optionally both a switch-on-constant and a switch-off-constant) such that the up-down-count-value is reduced.

This operation can allow for an automatic compensation to keep the LED current constant, even with rapidly changing output voltage such as in the pixel light application shown in FIG. 1.

Optionally, the comparator 740 can be a clocked comparator, which can be driven by the clock-signal of the clock-signal-generator 762. Such a clocked comparator has a first-input-terminal and a second-input-terminal, each of which is configured to receive a respective one of the sensed-signal and the reference-signal as input signals. The controller 701 can periodically swap which of the input signals is provided to which of the input-terminals in accordance with the clock-signal. For example, after every clock cycle, the inputs to the comparator 740 can be swapped. This can therefore eliminate or reduce the effect of any input offset of comparator 740 on the final LED current accuracy.

Figure 8:
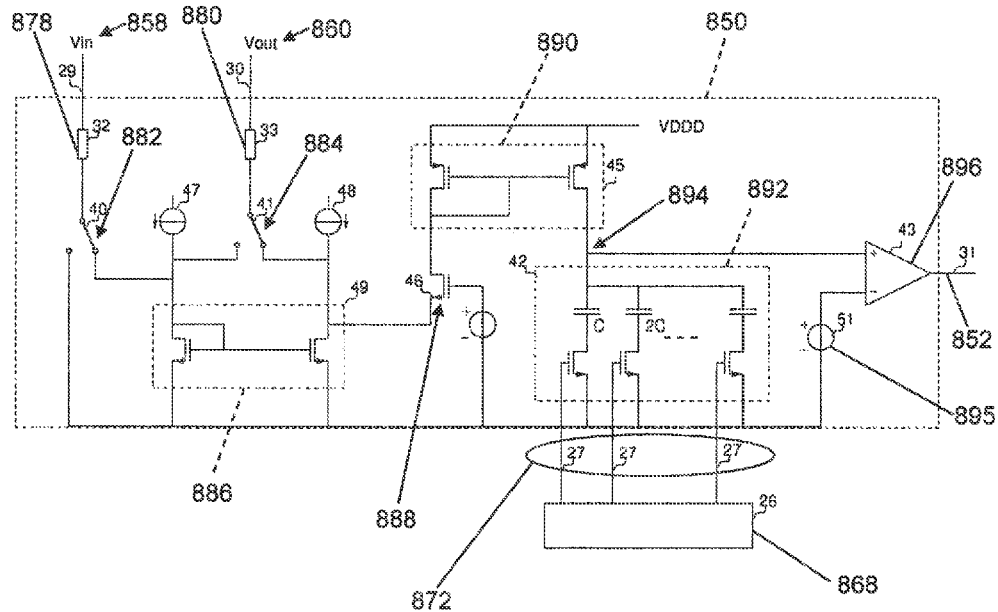
FIG. 8 shows a possible implementation of an analogue timer that can be used in FIG. 7.

FIG. 8 shows a possible implementation of an analogue timer 850 that can be used in FIG. 7, for example. This circuit has two resistors 878, 880 that connect Vin 858 and Vout 860 to switches 882 and 884 respectively. These switches 882, 884 are operated in accordance with state of the switch-control-signal (the gate control signal). When switch-control-signal is on/high, Vin 858 is connected to the input of a current mirror 886, and Vout 860 is connected to the output of the current mirror 886. Because Vin 858 is higher than Vout 860, there will be a net current proportional to Vin-Vout flowing from the source of an NMOS 888, and this current will charge, via a current mirror 890, a configurable capacitor-bank 892 that is connected to node 894. The signal (voltage) at node 894 is the same as the counter-value 658 that is shown in FIG. 6.

A delay-value-signal-generator 868 is shown in FIG. 8, which provides the same functionality as the corresponding component that is shown in FIG. 7. The delay-value-signal-generator 868 provides a delay-value-signal 872, which is used in the timer 850 to either include or exclude individual capacitors in the capacitor-bank 892, and thereby adjust an associated timing-constant. The total amount of capacitance that is provided by the configurable capacitor-bank 892 affects the slope with which the counter-value rises. That is, the counter value is the voltage on the capacitor, which is the voltage at node 894.

The timer 850 also includes a reference-voltage-source 895 that provides a reference-voltage that defines a timer-threshold value, such as the timer-threshold value 660 as it is shown in FIG. 6. The timer-threshold-value can be a fixed voltage. Its value can be set such that it is a little lower than a common mode range of a timer-comparator 896, but is not too low. If it were set too low, then the accuracy may be reduced.

The timer-comparator 896 compares (i) the counter-value at node 894, with (ii) the timer-threshold value from the reference-voltage-source 895, in order to trigger a change in the timer-output-signal 852 when the counter-value exceeds the timer-threshold.

Returning to the formula for the switch-on-time-delay-value (tgon), which was discussed above with reference to FIG. 5:

$$tgon = \frac{Tref * Vref}{Vled}$$

It is recalled that tgon is the time delay until the converter-switch (not shown in FIG. 8) is turned on. The tgon time starts after the configurable capacitor-bank 892 has been discharged (by a switch not shown in FIG. 8), and then is started to be charged by a charging current. When the timer 850 is operating as a switch-on-timer, switches 882 and 884 are switched to the left (which is opposite to what is shown in FIG. 8). The charging current for the configurable capacitor-bank 892 is therefore equal to Vout (860)/resistor (880). tgon can then be expressed as:

tgon=reference-voltage(895)*capacitor-bank(892)
 *resistor(880)/Vout(860)

Therefore, when the switch-on-constant (constant$_{on}$) is expressed as: tgon=Tref*Vref; Tref=capacitor-bank (892) *resistor (880); and Vref=reference-voltage (895).

Likewise, the formula for the switch-off-time-delay-value (tgoff):

$$tgoff = \frac{Tref * Vref}{Vin - Vled}$$

It is recalled that tgoff is the time delay until the converter-switch (not shown in FIG. 8) is turned off. The tgoff time also starts after the configurable capacitor-bank 892 has been discharged (by a switch not shown in FIG. 8), and then is started to be charged by a charging current. When the timer 850 is operating as a switch-off-timer, switches 882 and 884 are switched to the right (as shown in FIG. 8). The charging current for the configurable capacitor-bank 892 is therefore derived from (Vin (858)−Vout (860)).

tgoff can then be expressed as:

$tg\text{off} = \text{reference-voltage}(895) * \text{capacitor-bank}(892) / ((V\text{in}(858)/\text{resistor}(878) - V\text{out}(860)/\text{resistor}(880)))$ When the resistance of the resistor (878) is equal to the resistance of resistor (880), the equation simplifies to:

$tg\text{off} = \text{reference-voltage}(895) * \text{capacitor-bank}(892) * \text{resistor}(880)/(V\text{in}(858) - V\text{out}(860))$ Therefore, when the switch-off-constant (constant$_{off}$) is expressed as: Tref*Vref; Tref=capacitor-bank (892)*resistor (880); and Vref=reference-voltage (895). However, as discussed above, the value of the capacitance of the capacitor-bank (892) can be set differently depending upon whether the timer 850 is operating as a switch-off-timer or a switch-on-timer.

Since Vout/Vled can be allowed to change on the fly, the charging current of the capacitor-bank 892 can also change instantaneously, and therefore the actual capacitor voltage can be an accurate representation of the inductor voltage integrated over time.

It will be appreciated that the above discussion assumes that the transfer ratio of the current mirrors 886 and 890 is 1. That is, the output current of a current mirror is the same as the input current. For different transfer ratios, the above formulas can be easily adapted.

It will be appreciated from the above description that, when the gate is on, the switch-off-time-delay-value (tgoff) is set such that it is inversely proportional to Vin-Vout, and can be modified in accordance with a configurable switch-off-constant that is set based on the value of the delay-value-signal 872 for that phase of the switching cycle. Also, when the gate is off, and switches 882 and 884 only connect Vout 860 to charge the bank of capacitors 892, the switch-on-time-delay-value (tgon) is set such that it is inversely proportional to Vout 860, and can be modified in accordance with a configurable switch-on-constant that is set based on the value of the delay-value-signal 872 for that phase of the switching cycle. As discussed above, the value of the delay-value-signal 872 can be set differently for the different phases of the switching cycle.

One or more of the circuits disclosed herein can avoid disadvantages that can arise with hysteretic buck converters, for which the switching frequency not only depends on the input and output voltage, but also on the inductor value. Also, one or more of the circuits disclosed herein can have a reduced sensitivity to disturbances close to the trip point of the comparators. At the same time, large disturbances can exist, because in the converters the FETs can switch large voltages with a high dV/dt. For a single channel, the disturbance may only happen after the comparator decision, and therefore any undesired effects can be eliminated or reduced by introducing a suitable blanking time. Such a blanking time can be used to prevent undesired multiple switching due to noise coming from the switching node. For example, the comparator can be made insensitive for about 100 ns. The likelihood of experiencing fluctuations in the LED current can therefore also be reduced.

Also, using regulation with an analogue timer, as discussed above, can provide the following advantages over a hysteretic converter:

the single comparator can be relatively slow and therefore may not be sensitive to disturbances from other channels;

the analogue timer can be made insensitive to disturbances;

only one comparator is needed instead of two; and the switching frequency may not be dependent on the external component values.

An advantage of circuits disclosed herein over a PI controller, in particular, is that they can be unconditionally stable. As discussed above, in its most basic form, the circuit of FIG. 5 (with fixed timing-constants) can still suffer from line and load regulation issues. However, these issues can be addressed by adjusting the analogue delay timer capacitors (and hence the timing-constants) based on the duty cycle of the comparator, and regulating it to 50%. This adjustment of the delays can be done slowly, and therefore can have little impact on stability. In other examples, it can also be possible to feed the latched counter value into a PI or PID controller, and let the PI/PID controller regulate the delay setting in a similar way.

According to a first aspect of the present disclosure there is provided a controller for a power converter, the power converter comprising a converter-switch and a converter-inductor, the controller comprising:

a sensed-input-terminal configured to receive a sensed-signal that is representative of operation of the power converter;

a reference-input-terminal configured to receive a reference-signal;

a controller-output-terminal configured to provide a switch-control-signal for the converter-switch;

a comparator configured to provide a comparator-output-signal that has a comparator-output-state dependent on whether or not the sensed-signal is greater than the reference-signal, wherein the comparator-output-state can take a first-state-value or a second-state-value; and a delay-block configured to:
set a time-delay-value based on: (i) a voltage across the converter-inductor;
start a timer when the comparator-output-state changes; and
cause a change in the switch-control-signal when the timer reaches the time-delay-value.

In one or more embodiments the delay-block is configured to set the time-delay-value based on the inverse of the voltage across the converter-inductor.

In one or more embodiments the delay-block is also configured to set the time-delay-value based on: (ii) a timing-constant.

In one or more embodiments the delay-block comprises a calibration-block configured to:

determine an up-down-count-value, which is representative of a difference between, for a complete switching cycle: (a) a length of time that the comparator-output-signal has the first-state-value, and (b) a length of time that the comparator-output-signal has the second-state-value; and modify the timing-constant based on the up-down-count-value.

In one or more embodiments the calibration-block is configured to determine the up-down-count-value as a difference between: (a) a length of time that the comparator-output-signal has the first-state-value, and (b) a length of time that the comparator-output-signal has the second-state-value, for a plurality of complete switching cycles.

In one or more embodiments the calibration-block is configured to modify the timing-constant such that the up-down-count-value is reduced, this can involve reducing an absolute value of the up-down-count-value such that it is brought closer to zero.

In one or more embodiments the calibration-block further comprises:

a delay-reference-block configured to provide a default-delay-signal;

a delay-value-signal-generator configured to provide a delay-value-signal for setting the timing-constant. The delay-value-signal-generator may be configured to:
add the up-down-count-value to the default-delay-signal to provide the delay-value-signal, if the switch-control-signal has a first-state-value; and
subtract the up-down-count-value from the default-delay-signal to provide the delay-value-signal, if the switch-control-signal has a second-state-value.

In one or more embodiments the calibration-block is configured to be clocked by a clock-signal from a clock-signal-generator. The comparator may comprise a clocked comparator, which can also be configured to be clocked by the clock-signal from the clock-signal-generator.

In one or more embodiments the clocked comparator has a first-input-terminal and a second-input-terminal, each of which is configured to receive a respective one of the sensed-signal and the reference-signal as input signals. The controller may be configured to periodically swap which of the input signals is provided to which of the input-terminals, in accordance with the clock-signal.

In one or more embodiments the delay-block is configured to:
set a switch-off-time-delay-value based on: (i) the voltage across the converter-inductor and (ii) a switch-off-constant;
start a switch-off-timer when the signal-state of the comparator-output-signal changes from the first-state-value to the second-state-value; and
cause a change in the switch-control-signal when the switch-off-timer reaches the switch-off-time-delay-value.

In one or more embodiments the delay-block is configured to determine the voltage across the converter-inductor based on the difference between (a) an input voltage of the converter, and (b) an output voltage of the converter.

In one or more embodiments the delay-block is configured to:
set a switch-on-time-delay-value based on: (i) the negative value of the voltage across the converter-inductor; and (ii) a switch-on-constant
start a switch-on-timer when the signal-state of the comparator-output-signal changes from the second-state-value to the first-state-value; and
cause a change in the switch-control-signal when the switch-on-timer reaches the switch-on-time-delay-value.

In one or more embodiments the delay-block is configured to determine the negative value of the voltage across the converter-inductor based on the output voltage of the converter.

In one or more embodiments the sensed-signal is representative of an instantaneous value of an operating condition of the power-converter. The sensed-signal may be representative of an instantaneous value of the current through the converter-inductor. The reference-signal may be representative of target value for the current through the converter-inductor.

There may be provided an integrated circuit, an electronic device or a system comprising any controller disclosed herein.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. A controller for a power converter, the power converter comprising a converter-switch and a converter-inductor, the controller comprising:
   a sensed-input-terminal configured to receive a sensed-signal that is representative of operation of the power converter;
   a reference-input-terminal configured to receive a reference-signal;
   a controller-output-terminal configured to provide a switch-control-signal for the converter-switch;
   a comparator configured to provide a comparator-output-signal that has a comparator-output-state dependent on whether or not the sensed-signal is greater than the reference-signal, wherein the comparator-output-state can take a first-state-value or a second-state-value; and
   a delay-block configured to:
     set a time-delay-value based on: (i) a voltage across the converter-inductor;
     start a timer when the comparator-output-state changes; and
     cause a change in the switch-control-signal when the timer reaches the time-delay-value.

2. The controller of claim 1, wherein the delay-block is configured to set the time-delay-value based on the inverse of the voltage across the converter-inductor.

3. The controller of claim 1, wherein the delay-block is also configured to set the time-delay-value based on: (ii) a timing-constant.

4. The controller of claim 3, wherein the delay-block comprises a calibration-block configured to:
   determine an up-down-count-value, which is representative of a difference between, for a complete switching cycle: (a) a length of time that the comparator-output-signal has the first-state-value, and (b) a length of time that the comparator-output-signal has the second-state-value; and
   modify the timing-constant based on the up-down-count-value.

5. The controller of claim 4, wherein the calibration-block is configured to determine the up-down-count-value as a difference between: (a) a length of time that the comparator-output-signal has the first-state-value, and (b) a length of time that the comparator-output-signal has the second-state-value, for a plurality of complete switching cycles.

6. The controller of claim 4, wherein the calibration-block is configured to modify the timing-constant such that the up-down-count-value is reduced.

7. The controller of claim 4, wherein the calibration-block further comprises:
   a delay-reference-block configured to provide a default-delay-signal;
   a delay-value-signal-generator configured to provide a delay-value-signal for setting the timing-constant, wherein the delay-value-signal-generator is configured to:
     add the up-down-count-value to the default-delay-signal to provide the delay-value-signal, if the switch-control-signal has a first-state-value; and
     subtract the up-down-count-value from the default-delay-signal to provide the delay-value-signal, if the switch-control-signal has a second-state-value.

8. The controller of claim 4, wherein:
   the calibration-block is configured to be clocked by a clock-signal from a clock-signal-generator; and
   the comparator comprises a clocked comparator, which is also configured to be clocked by the clock-signal from the clock-signal-generator.

9. The controller of claim 8, wherein the clocked comparator has a first-input-terminal and a second-input-terminal, each of which is configured to receive a respective one of the sensed-signal and the reference-signal as input signals, wherein the controller is configured to periodically swap which of the input signals is provided to which of the input-terminals, in accordance with the clock-signal.

10. The controller of claim 1, wherein the delay-block is configured to:
    set a switch-off-time-delay-value based on: (i) the voltage across the converter-inductor and (ii) a switch-off-constant;
    start a switch-off-timer when the signal-state of the comparator-output-signal changes from the first-state-value to the second-state-value; and
    cause a change in the switch-control-signal when the switch-off-timer reaches the switch-off-time-delay-value.

11. The controller of claim 10, wherein the delay-block is configured to determine the voltage across the converter-inductor based on the difference between (a) an input voltage of the converter, and (b) an output voltage of the converter.

12. The controller of claim 1, wherein the delay-block is configured to:
    set a switch-on-time-delay-value based on: (i) the negative value of the voltage across the converter-inductor; and (ii) a switch-on-constant
    start a switch-on-timer when the signal-state of the comparator-output-signal changes from the second-state-value to the first-state-value; and
    cause a change in the switch-control-signal when the switch-on-timer reaches the switch-on-time-delay-value.

13. The controller of claim 12, wherein the delay-block is configured to determine the negative value of the voltage across the converter-inductor based on the output voltage of the converter.

14. The controller of claim 1, wherein the sensed-signal is representative of an instantaneous value of the current through the converter-inductor.

15. The controller of claim 1, wherein the reference-signal is representative of target value for the current through the converter-inductor.

* * * * *